(12) United States Patent
Nakamura et al.

(10) Patent No.: US 7,695,689 B2
(45) Date of Patent: Apr. 13, 2010

(54) MICRO REACTOR DEVICE AND METHOD OF MANUFACTURING MICRO REACTOR DEVICE

(75) Inventors: Hiroyuki Nakamura, Tosu (JP); Hongzhi Wang, Tosu (JP); Xianying Li, Tosu (JP); Masaya Miyazaki, Tosu (JP); Kenichi Yamashita, Tosu (JP); Yoshiko Yamaguchi, Tosu (JP); Hideaki Maeda, Tosu (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 1427 days.

(21) Appl. No.: 10/521,469

(22) PCT Filed: Jul. 17, 2003

(86) PCT No.: PCT/JP03/09097

§ 371 (c)(1),
(2), (4) Date: Jan. 18, 2005

(87) PCT Pub. No.: WO2004/009231

PCT Pub. Date: Jan. 29, 2004

(65) Prior Publication Data

US 2006/0062701 A1    Mar. 23, 2006

(30) Foreign Application Priority Data

Jul. 18, 2002   (JP)   ............... 2002-210144

(51) Int. Cl.
*B01J 19/00*    (2006.01)
(52) U.S. Cl. ..................................... 422/130
(58) Field of Classification Search ............. 422/130
See application file for complete search history.

(56) References Cited

U.S. PATENT DOCUMENTS 4,657,742 A    4/1987   Beaver (Continued)

FOREIGN PATENT DOCUMENTS

JP        62-004440        1/1987

(Continued)

OTHER PUBLICATIONS

Kenis, P.J. A; Ismagilov, R.F.; Whitesides, G.M."Microfabrication Inside Capillaires Using Multiphase Laminar Flow Patterning." Science, 1999, 285, pp. 83-85.*

(Continued)

*Primary Examiner*—Walter D Griffin
*Assistant Examiner*—Bobby Ramdhanie
(74) *Attorney, Agent, or Firm*—Harness, Dickey & Pierce, P.L.C.

(57) ABSTRACT

The present invention relates to a method of manufacturing a micro reactor device that includes a tubular reactor (1) as a flow path, for allowing reaction species to react in the reactor (1). The micro reactor device is manufactured by forming a particle layer (2) on an inner wall of the reactor (1). The particle layer (2) can be formed by causing a dispersion liquid of particles to flow through the reactor (1) and drying. In this way, it is possible to provide a method of manufacturing a micro reactor device having an inner wall modified so that the reaction species can react more efficiently, and to provide the micro reactor device.

23 Claims, 5 Drawing Sheets

U.S. PATENT DOCUMENTS

| | | |
|---|---|---|
| 4,715,105 A | 12/1987 | Beaver |
| 5,139,668 A | 8/1992 | Pan et al. |
| 6,890,411 B1 | 5/2005 | Hayes et al. |

FOREIGN PATENT DOCUMENTS

| | | |
|---|---|---|
| JP | 3-217213 | 9/1991 |
| JP | 04-290537 | 10/1992 |
| JP | 2000-246805 | 9/2000 |
| JP | 2002-517751 | 6/2002 |
| JP | 2003-301295 | 10/2003 |
| WO | WO 00/77509 A1 | 12/2000 |

OTHER PUBLICATIONS

Cepak, V. M.; Hulteen, J.C.; Che, G.; Jirage, K. B.; Lakshmi, B. B.; Fisher, E. R.; Martin, C. R. "Fabrication and characterization of concentric-tubular composite micro-and nanostructures using the template-synthesis method." Journal of Materials Research, 1998, vol. 13, No. 11, pp. 3070-3080.*

Hongzi Wang et al., "Continuous Self Arrangement of Nanoparticles in a Micro-Capillary", Micro Total Analysis Systems 2002, vol. 1, pp. 437-439, 2002.

Hongzi Wang et al., "Continuous Particle Self-Arrangement in a Long Microcapillary", Advanced Materials, vol. 14, No. 222, pp. 1662-1666, Nov. 18, 2002.

Xianying Li et al., "Modified micro-space using self-organized nanoparticles for reduction of methylene blue", Chem. Commun., 2003, pp. 964-965.

Hongzi Wang et al., "Continuous particle self-arrangement in a micro-capillary", Micro-Nano System Summary of Lecture, 7a09, p. 55, Aug. 2002.

Hongzi Wang et al., "Inner Surface Modification in a Capillary by Nano-Particle Arrangement", $35^{th}$ Autumn Meeting of the Society of Chemical Engineers, Japan, Sep. 2002.

Xianying Li et al., "Photocatalytic Reaction in a Micro-channel Modified with Self-assembled Composite Nanoparticles", $7^{th}$ Research Conference on Chemical and Micro-Nano System Summary of Lecture, 2P05, p. 49, Apr. 2003.

Xianying Li et al., "Surface Modification of Microchannel by Self-assembled Particles for Catalytic Reaction", $68^{th}$ Conference(2003) of the Society of Chemical Engineers, Japan Summary of Lecture on Research, C106, Mar. 2003.

Office Action for corresponding Japanese Application No. 2004-522750 dated Jul. 22, 2008 with English translation.

* cited by examiner

MICRO REACTOR DEVICE AND METHOD OF MANUFACTURING MICRO REACTOR DEVICE

TECHNICAL FIELD

The present invention relates to a method of manufacturing a micro reactor device and relates to a micro reactor device. In particular, the present invention relates to a method of manufacturing a micro reactor device that can attain high efficiency and precise catalyst reactions as a catalyst reactor device, can be used as an electrochemical reactor device, and can be provided with a sensor, and relates to the micro reactor device.

BACKGROUND ART

A micro reactor device has, for example, a tubular reactor having a small diameter. By causing various reaction species to pass through the reactor as a flow path, various reactions, such as production of materials and catalyst reactions, are caused. In the micro reactor device, walls of the reactor (reactor wall) have a large surface area with respect to reactor volume, and a diffusion distance (a distance between the reaction species passing through the reactor and the reactor wall) is short. With this structure, by causing the reactor wall to support a catalyst, for example, it is possible to increase area of contact between the reaction species and the catalyst, and thereby allow for high-efficiency catalyst reactions. Therefore, the micro reactor device is regarded as a promising catalyst reactor device.

It is a common practice to cause the reactor wall to support the catalyst by a sol-gel method, in using the micro reactor device as a catalyst reactor device as described above.

However, according to this supporting method, an area on which the catalyst is supported is only as large as the surface area of the reactor wall of the reactor as a flow path. As a result, there is a problem that only a limited amount of catalyst can be supported.

Even if the amount of catalyst is increased by causing the reactor wall to support a thicker layer of catalyst, there is a problem that almost only the catalyst exposed on the surface of the catalyst layer can be used for catalyst reactions, because a significant pressure loss is caused inside the catalyst layer.

If it is necessary to control a very short reaction time, such as a partial oxidization time, a diffusion time of the reaction species in the catalyst varies. Therefore, there is a problem that a contact time varies, resulting in various kinds of reaction products.

Moreover, the method of supporting the catalyst has a problem that complex operation is required in order to expose the catalyst directly to the reactor wall.

The present invention was made in view of the foregoing problems. An object of the present invention is to provide a method of manufacturing a micro reactor device having an inner wall modified so that reaction species can react more efficiently, and to provide the micro reactor device.

DISCLOSURE OF INVENTION

As a result of diligent study on a method of supporting a catalyst on a wall of a flow path, the inventors of the present invention found that a deposition layer including particles (particle layer) can be formed on the inner wall of the reactor of the micro reactor device, and reached the present invention.

To solve the foregoing problems, a method of the present invention for manufacturing a micro reactor device that includes a tubular reactor as a flow path and allows reaction species to react in the reactor includes the step of: forming a particle layer including particles on an inner wall of the reactor. It is preferable that the particle layer is formed by causing a dispersion liquid of particles to flow through the reactor and drying the reactor (drying the dispersion liquid). The tubular reactor has a hollow structure, so as to allow a predetermined material to pass therethrough.

It is preferable that a solvent of the dispersion liquid is a mixed solvent including at least two kinds of solvents. By thus using a mixed solvent including at least two kinds of solvents, it is possible to adjust the drying rate of the dispersion liquid.

It is preferable that the flow path has a cross section of a round or elliptical shape. In this way, it is possible to make the meniscus have a more even shape and thereby control the thickness of the particle layer evenly.

The particles themselves may be a catalyst, or a functional material, such as a catalyst, may be supported by the particle layer. With this arrangement, the micro reactor device can be used as a catalyst reactor device. In this case, since there are spaces between the particles in the particle layer, the area of contact between the reaction species and the catalyst that occurs when the reaction species pass through the reactor is large. Therefore, it is possible to increase the efficiency of catalyst reactions. Even in the case of a very short reaction such as partial oxidization, it is possible to reduce variation of the dispersion time of the reaction species in the catalyst and the contact time of the reaction species with the catalyst. As a result, it is possible to reduce variation of the kinds of reaction products. Since the variation of the dispersion time of the reaction species can also be reduced in this case, it is preferable that the spaces are structured regularly. In other words, it is preferable that, in the particle layer, particles having even diameters are aligned regularly.

The foregoing method may have an arrangement in which a hydrophilicity process and a hydrophobicity process are performed on desired regions of the inner wall of the reactor, and a water dispersion liquid of particles is caused to flow through the reactor. With this arrangement, a patterned particle layer can be formed on the inner wall of the reactor. By thus providing a patterned particle layer, more precise and complex reactions of the reaction species are made possible.

The particles may be a conductive material, and electrodes may be formed by sintering the particles. Furthermore, the electrodes may be used as a sensor. With these arrangements, the micro reactor device can, for example, produce a material by electrochemical reactions and/or detect reactions. Also in this case, it is preferable that the particles in the particle layer are aligned regularly and densely, so as to obtain high-density electrodes by low-temperature sintering.

The foregoing method may have an arrangement in which, using the particle layer as a mold, a layer is formed by filling spaces between the particles of the particle layer with sol or nanoparticles and solidifying the sol or nanoparticles, and the particles of the particle layer are removed. The nanoparticles are particles whose diameters are between several nanometers and ten or so nanometers.

The sol or nanoparticles are not particularly limited, as long as they can be filled into the spaces between the particles of the particle layer and solidified. By using latex beads, for example, as the particles, it is possible to remove the particles by thermal decomposition. If gel is used, in particular, the layer (layer formed by filling and solidifying the sol or nanoparticles) is a gel layer. In this case, after the particle layer is removed, pores are formed by those parts where the particles existed. The gel layer may support a functional material such as a catalyst. When the reaction species pass through the gel layer, area of contact between the reaction species and the catalyst is large, due to the pores. This can increase efficiency of catalyst reactions. If the nanoparticles are used, a layer can be formed by solidifying the nanoparticles by sintering. Therefore, the same effect as that of the gel layer can be attained.

To solve the foregoing problems, a micro reactor device of the present invention, including a tubular reactor as a flow path, for allowing reaction species to react in the reactor, further includes: a particle layer including particles, provided on an inner wall of the reactor.

It is preferable that the flow path has a diameter between 1 μm and 1 mm. With this arrangement, it is possible to reduce pressure loss and maintain appropriate dispersion time of the reaction species. Therefore, it is possible to provide a good reactor.

It is preferable that the particles of the particle layer have a diameter between 1 nm and 10 μm. With this arrangement, it is possible to deposit the particles evenly and thereby form an even particle layer. In addition, since the particles do not peel off easily, it is possible to prevent the loss of the particle layer.

It is preferable that the particle layer has a thickness of not more than 5 μm. If the thickness of the particle layer is more than 5 μm, the particle layer cracks easily, and there is a possibility that the particle layer is lost from the inner wall of the reactor.

It is preferable that the particles are a catalyst. Moreover, it is preferable that the particles are composite particles supporting a functional material such as a catalyst. With these arrangements, the micro reactor device can be used as a catalyst reactor device. In this case, since there are spaces between the particles in the particle layer, the area of contact between the reaction species and the catalyst that occurs when the reaction species pass through the reactor is large. Therefore, it is possible to increase the efficiency of catalyst reactions. Even in the case of a very short reaction such as partial oxidization, it is possible to reduce variation of the dispersion time of the reaction species in the catalyst and the contact time of the reaction species with the catalyst. As a result, it is possible to reduce variation of the kinds of reaction products.

It is preferable that the particle layer is patterned. By thus providing a patterned particle layer, more precise and complex reactions of the reaction species are made possible.

A micro reactor device of the present invention, including a tubular reactor as a flow path, for allowing reaction species to react in the reactor, further includes: patterned electrodes provided in an inner wall of the reactor.

With this arrangement, the electrodes can be used as a sensor, and the micro reactor device can, for example, produce a material by electrochemical reactions and/or detect reactions.

A micro reactor device of the present invention, including a tubular reactor as a flow path, for allowing reaction species to react in the reactor, further includes: a layer having particle-shaped pores, provided on an inner wall of the reactor.

According to this arrangement, the layer can support a functional material such as a catalyst, because the layer has the particle-shaped pores. When the reaction species pass through this layer, area of contact between the reaction species and the catalyst is large, due to the pores. This can increase efficiency of catalyst reactions.

For a fuller understanding of the nature and advantages of the invention, reference should be made to the ensuing detailed description taken in conjunction with the accompanying drawings.

BEST MODE FOR CARRYING OUT THE INVENTION

Embodiment 1

Figure 1:
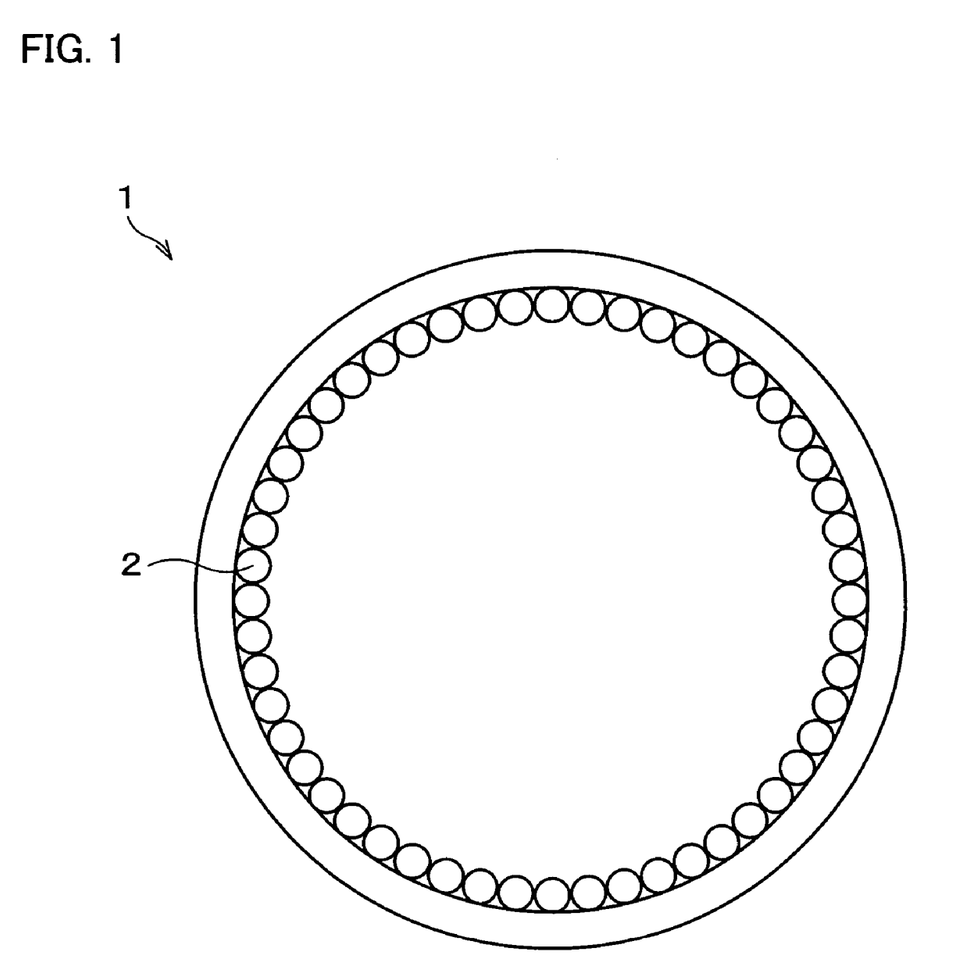
FIG. 1 is a cross-sectional view of a major part of a micro reactor of one embodiment of the present invention.
Figure 2:
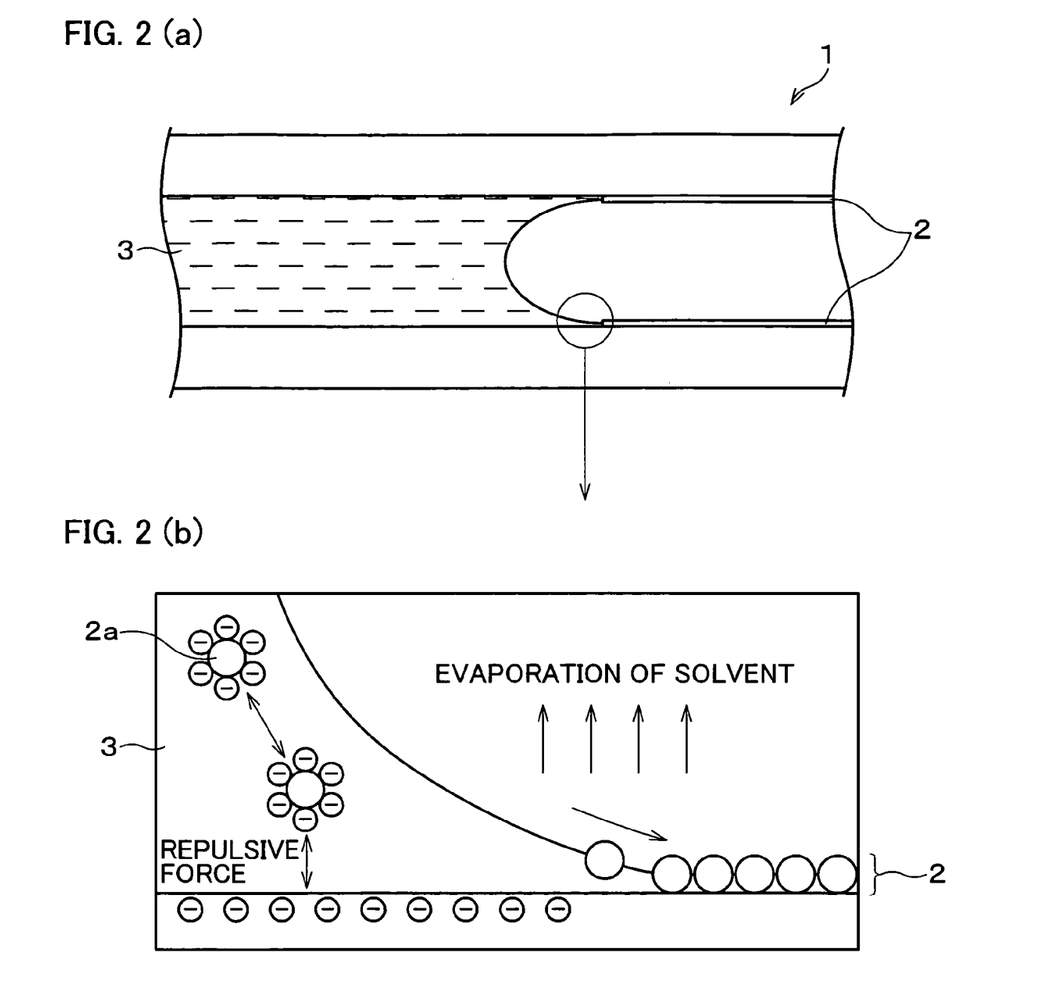
FIGS. 2(a) and 2(b) are diagrams illustrating a step of forming a particle layer in the micro reactor of the present invention.

With reference to FIGS. 1, 2(a), and 2(b), the following describes one embodiment of the present invention.

As shown in FIG. 1, a micro reactor (micro reactor device) of the present embodiment has a tubular reactor 1 as a reaction field. The reactor 1 has a particle layer 2 including a plurality of particles aligned on an inner wall of the reactor 1. In this reactor, various kinds of reaction species can be reacted by passing through the reactor 1 as a flow path. The tubular reactor 1 has a hollow for allowing predetermined materials to pass therethrough.

With reference to FIGS. 2(a) and 2(b), the following describes a method of manufacturing the particle layer 2 of the reactor 1 (method of manufacturing a micro reactor). Discussed below is a case in which the particles are charged negatively and the inner wall of the reactor is charged negatively.

First, a solution (dispersion liquid) containing fine particles dispersed in a solvent is poured into the reactor 1. In the present embodiment, the dispersion liquid is a colloidal solution. The dispersion liquid includes a suspension and the like.

Next, as shown in FIG. 2(a), a gas-liquid surface is gradually moved while a colloidal solution 3 is dried. In this way, fine particles are deposited on the inner wall of the reactor 1 and thereby form the particle layer 2.

More specifically, as shown in FIG. 2(b), fine particles 2a in the colloidal solution 3 are separated from each other due to repulsive force. Where the amount of the colloidal solution 3 is large, the fine particles 2a and the inner wall of the reactor 1 are separated due to repulsive force. Meanwhile, the gas-liquid surface forms a meniscus. At a part of the meniscus that contacts the inner wall, the colloidal solution 3 is thin. Therefore, the solvent of the colloidal solution 3 is evaporated, and the fine particles 2a are adsorbed to the inner wall of the reactor 1 due to advectional assembly and lateral capillary force. Then, the fine particles 2a are aligned on the inner wall of the reactor 1 and thereby form the particle layer 2. The particle layer 2 can be formed at such a part that has excellent wettability with the colloidal solution and forms a thin meniscus. The diameter of the flow path is preferably not smaller than 1 μm and preferably not larger than 1 mm. If the diameter of the flow path is smaller than 1 μm, the pressure loss is so significant that the micro reactor cannot be used. On the other hand, if the diameter of the flow path is larger than 1 mm, the diffusion time of the reaction species is so long that characteristics of the micro reactor cannot be attained. Thus, by designing the diameter of the flow path to be not smaller than 1 μm and not larger than 1 mm, it is possible to reduce the pressure loss in the micro reactor and thereby maintain an appropriate diffusion time of the reaction species.

Even if the fine particles 2a have various diameters, the fine particles 2a can be aligned as the particle layer 2. If the fine particles 2a have a uniform diameter, it is possible to align the fine particles 2a more evenly and regularly. If the fine particles 2a are monodisperse in the colloidal solution 3, it is possible to align the fine particles 2a yet more evenly and regularly. It is preferable that the diameter of the fine particles 2a is between 1 nm and 10 μm. It is problematic to regard the fine particles 2a as particles when the diameter of the fine particles 2a is smaller than 1 nm. In this specification, therefore, the fine particles 2a are regarded as particles when the diameter of the fine particles 2a is not smaller than 1 nm. If the diameter of the fine particles 2a is larger than 10 μm, it is difficult to deposit the particles evenly, hence to form the particle layer 2 evenly. In addition, the particle layer 2 could be lost because the particles could peel off the inner wall easily.

The thickness of the particle layer 2 is determined by the shape of the meniscus on the gas-liquid surface under drying. therefore, in order to make the thickness of the particle layer 2 even, it is preferable that a cross-section of the reactor 1 is round or elliptical, so that the meniscus has a more even shape.

The thickness of the particle layer 2 can be adjusted freely between a single-particle layer (that is, the diameter of the particles 2a) and about 20 μm, by adjusting the evaporation rate of the solvent of the colloidal solution 3 and/or the concentration of the fine particles 2a in forming the particle layer 2. In order to adjust the evaporation rate of the solvent of the colloidal solution 3, heat may be applied during evaporation. The thickness of the particle layer 2 is preferably not more than 20 μm. If the thickness of the particle layer 2 is more than 20 μm, the particle layer 2 cracks easily, and there is a possibility that the particle layer 2 is lost from the inner wall of the reactor 1. It is preferable that the particle layer 2 can completely cover the inner wall of the reactor 1, because this prevents loss of the particle layer 2 even if the particle layer 2 cracks.

The length of the particle layer 2 (length in a traveling direction of the reaction species in the reactor 1) is basically not limited. However, considering a practical drying rate and a time required for preparation of the particle layer 2, a preferable length of the particle layer 2 is not more than 20 m.

The reactor 1 may be made of a commonly used material; namely, metal, ceramics, polymer molecules, and the like material that can form a tube shape. It is preferable that the reactor 1 is made of such a material that does not hinder reactions of the reaction species.

For example, the fine particles 2a may be a ceramic material such as silica, titania, alumina, tin oxide, zinc oxide, zinc sulphide, and cadmium selenide; a metal material such as platinum, gold, silver, and copper; or a polymeric material such as polymethyl methacrylic acid, polystyrene, and protein. It is preferable that the fine particles 2a are made of such a material that does not hinder reactions of the reaction species.

The fine particles 2a may be composite particles obtained by combining base material particles and a functional material. In other words, the fine particles 2a may be composite particles in which a functional material is supported by base material particles. In this way, it is possible to form the particle layer 2 by using composite particles.

It is preferable that the composite particles are covered particles in which a surface of base material particles is covered with a functional material. In other words, it is preferable that the composite particles are covered particles having a core-shell structure, in which a surface of core particles of a base material is covered. Since the covered particles are covered with a functional material, it is possible to react efficiently the functional material and a compound that can react with the functional material.

It is preferable that the particle diameter of the functional material is smaller than the particle diameter of the particles. In this way, each particle can support (can be covered with, preferably) a larger amount of the functional material. As a result, reactivity of the particle layer is improved.

The functional material may be determined appropriately in accordance with the reaction species that pass through the flow path of the micro reactor. Examples of the functional material include a catalyst and biofunctional materials such as protein and enzyme. Examples of the catalyst include metal compounds such as titania and cadmium selenide; and metals such as platinum, palladium, and nickel. Examples of the biofunctional materials such as protein and enzyme include trypsin and lipase.

The composite particles can be manufactured easily by a heterocoagulation method. However, a method of manufacturing the composite particles is not particularly limited. If the composite particles are to be manufactured by the heterocoagulation method, it is preferable to control charges on the surface of the particles supported by or covered with the functional material, by using a surface-active agent. More specifically, for example, it is preferable to modify the charges on the surface of the core particles so that the charges on the surface of the core particles become different from charges of the functional material. In this way, the functional material can be supported on, or provided so as to cover, the surface of the core particles efficiently. The surface-active agent may be set appropriately in accordance with the charges of the core particles, with no particular limitation. Examples of the surface-active agent include polyethyleneimide, polyvinyl acetate, and polyvinylpyrrolidone.

Instead of forming the particle layer by using the composite particles supporting or covered with the functional group, the functional material may be adsorbed to the fine particles 2a after the fine particles 2a are adsorbed to the inner wall of the micro reactor.

As the solvent of the colloidal solution 3, it is necessary to choose a dispersion medium (solvent) that can stably disperse the fine particles 2a. The dispersion medium may be selected, for example, from commonly used dispersion mediums such as water, ethanol, acetone, toluene, hexane, and chloroform, and a mixed solvent of these dispersion mediums. In order to improve stability of the fine particles 2a in the dispersion medium, a surface-active agent such as polyethyleneglycol may be added to the dispersion medium, if appropriate. By using a mixed solvent, it is possible to adjust the drying rate of the dispersion liquid.

If the fine particles 2a are a catalyst, the micro reactor functions as a catalyst reactor device. Examples of a catalysis of the catalyst include a photocatalysis, a contact oxidative reaction, a partial oxidative reaction, and an electrocatalysis. In the particle layer 2, the fine particles 2a are aligned, with spaces therebetween. Thus, when the reaction species pass through the micro reactor, the reaction species can contact almost all of the fine particles 2a. This makes the area of contact of the catalyst very large, and thereby improves catalyst efficiency. Therefore, in the case of a very short reaction such as partial oxidization, it is possible to reduce variation of the dispersion time of the reaction species in the catalyst. By reducing the variation of the dispersion time of the reaction species, it is possible to reduce variation of the kinds of reaction products. Thus, it is possible to control reactions.

If the fine particles 2a is aligned regularly in the particle layer 2, the catalyst can be distributed evenly. Therefore, it is possible to attain an even pore size distribution and thereby increase uniformity and controllability of the reactions.

The particle layer 2 can be formed at such a part that has excellent wettability with the colloidal solution 3 and forms a thin meniscus. On the other hand, the particle layer 2 cannot be formed at such a part that does not have excellent wettability with the colloidal solution 3. In view of this characteristic, the particle layer 2 can be patterned by designing the inner wall of the reactor 1 so as to have a part that has wettability with the colloidal solution 3 and a part that does not have wettability with the colloidal solution 3. Specifically, the part where the particle layer 2 is to be formed is designed so as to have wettability with the colloidal solution 3, and the other parts are designed so as not to have wettability with the colloidal solution 3. By thus controlling the wettability of the inner wall of the reactor 1 and controlling the shape of the meniscus, it is possible to form the particle layer 2 having a desired shape in a desired position on the inner wall of the reactor 1.

Specifically, the particle layer 2 can be patterned by controlling hydrophobicity and hydrophilicity of the inner wall of the reactor 1. More specifically, the inner wall of the reactor 1 is subjected to a hydrophobicity process and a hydrophilicity process. Then, a colloidal solution 3 containing water as a solvent is poured into the reactor 1. By dying the colloidal solution 3 while controlling the shape of the meniscus, it is possible to form the particle layer 2 only at the part subjected to the hydrophilicity process.

In this way, the particle layer 2 having a desired shape can be formed in a desired position of the inner wall of the reactor 1. Therefore, it is possible to cause more accurate and complex reactions.

The particle layer 2 can be formed also by a heterocoagulation method in which the particles are agglutinated to the inner wall of the reactor 1 by electrostatic repulsive force, a method in which the particles are chemically bonded to the inner wall of the reactor, or the like method.

Embodiment 2

Figure 3:
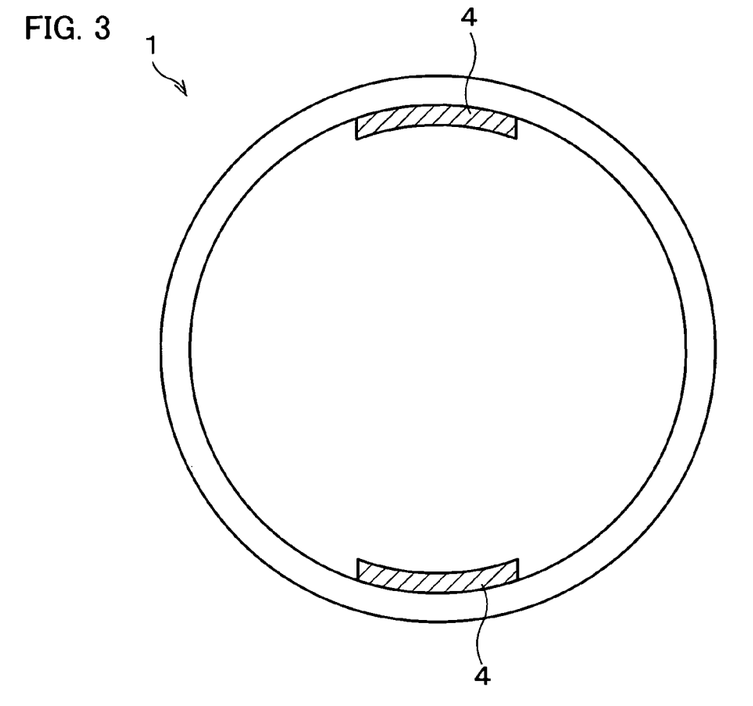
FIG. 3 is a cross-sectional view of a major part of a micro reactor of another embodiment of the present invention.

With reference to FIG. 3, the following describes another embodiment of the present invention. For the purpose of explanation, members whose functions are identical to those of the members described in EMBODIMENT 1 are labeled with identical reference marks, and explanation of these members are omitted.

By providing such members as electrodes and/or a sensor inside the reactor of a micro reactor device, it is possible, for example, to produce materials by electrochemical reactions, and/or to detect reactions. In order to provide the electrodes and/or the sensor inside the reactor, it is necessary to perform such operation as sputtering, and to use a complex device. In addition, depending on characteristics of the sputtering, only a limited material can be used, and structures of the electrodes and/or the sensor are limited. If a capillary-type reactor is used in the micro reactor device that is a space closed by the sputtering as described above, it is very difficult to provide the electrodes and/or the sensor inside the reactor.

In view of this problem, in the present embodiment, the particle layer 2 of EMBODIMENT 1 is made of a metal material, for example, and the metal material is sintered so as to form electrodes 4.

That is, as in EMBODIMENT 1, the particle layer 2 having a desired shape is patterned in a desired position of the reactor 1, and the particle layer 2 is sintered so as to form the electrodes 4, as shown in FIG. 3.

In this way, the electrodes 4 can be formed on the inner wall of the micro reactor, which is a closed space. As a result, it is possible, for example, to produce materials by electrochemical reactions, and/or to detect reactions, in the reactor 1. In the colloidal solution 3, the fine particles may be a conductive material that can become a colloid. Examples of the fine particles in the colloidal solution 3 include metal nanoparticles such as gold nanoparticles, silver nanoparticles and copper nanoparticles; conductive polymer nanoparticles such as polyaniline and polypyrrole; conductive inorganic compound nanoparticles such as carbon colloid, tin oxide, indium-tin oxide; and composite nanoparticles in which these particles are mixed.

Embodiment 3

Figure 4:
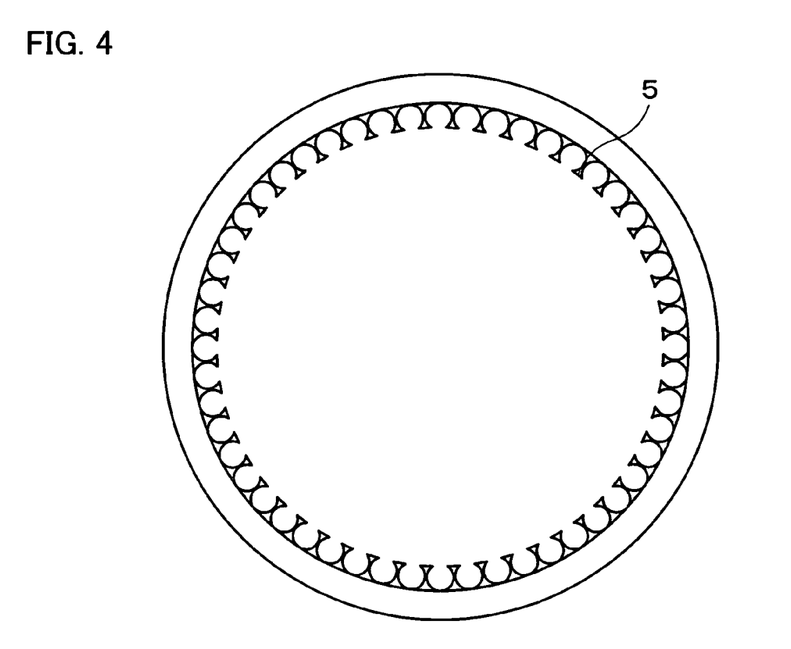
FIG. 4 is a cross-sectional view of a major part of a micro reactor of yet another embodiment of the present invention.

With reference to FIG. 4, the following describes yet another embodiment of the present invention.

For the purpose of explanation, members whose functions are identical to those of the members described in EMBODIMENT 1 are labeled with identical reference marks, and explanation of these members are omitted.

In the present embodiment, the particle layer 2 formed in EMBODIMENT 1 is used as a mold, so as to form a layer having a high pore ratio. Then, the particles of the particle layer 2 are removed, and a functional material such as a catalyst is supported by the layer having a high pore ratio. Thus, a functional material such as a catalyst is supported by the inner wall of the micro reactor.

First, as described in EMBODIMENT 1, the particle layer 2 is formed. The spaces between particles in the particle layer is filled with a material such as fine particles (nanoparticles) and silica sol. The fine particles or silica sol are solidified by drying or sintering, for example, so as to form a layer. Then, the particles in the particle layer are removed. In this way, as shown in FIG. 4, vacancies are created in the spaces where the particles existed. As a result, a reverse opal shape layer 5 is formed. Thus, the layer 5 can be formed by using the particle layer as a mold. In addition, the functional material or the like can be supported by the vacancies. If the particles of the particle film, which is used as a mold, are aligned basically, it is less likely that the movement speed of the reaction species in the layer varies. This improves reaction controllability.

The particles can be removed if, for example, the particles are latex beads and are thermally decomposed.

EXAMPLES

The following examples more specifically describe the present invention. Note, however, that the present invention is not limited to these examples.

Example 1

In the present example, a silica particle layer was formed on the inner wall of the reactor in the micro reactor of EMBODIMENT 1, and a platinum catalyst was supported by the surface of the silica particle layer.

Figure 5:
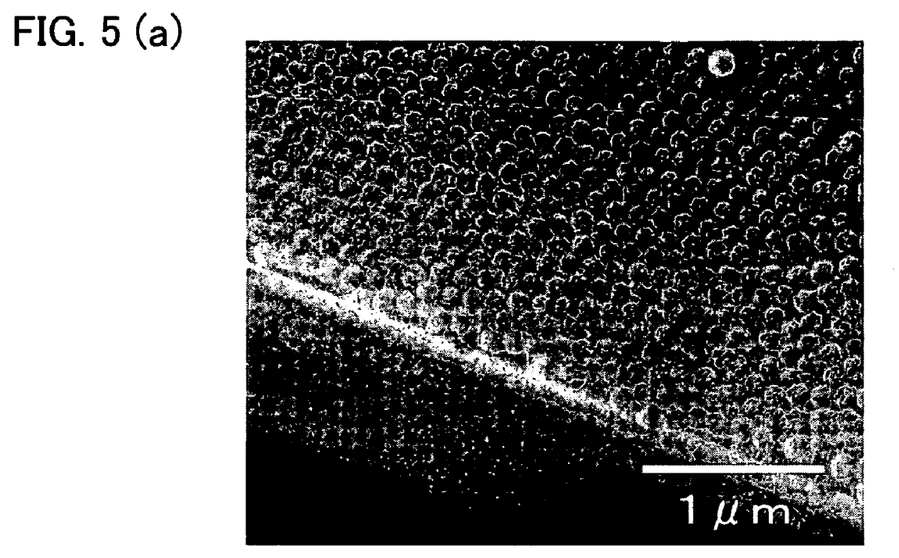
FIGS. 5(a) and 5(b) are images of a particle layer formed in EXAMPLE 1.

First, a suspension was prepared by causing silica particles (particle diameter: 0.15 μm) to be suspended in a mixed solvent of ethanol and water (ethanol: water=1:9). The suspension was poured into the capillary-type micro reactor, and dried at 80° C., so as to form a silica particle layer (particle layer) on the inner wall of the micro reactor. The thickness of the silica particle layer could be adjusted by adjusting the drying temperature and/or the concentration of the suspension. The thickness could be adjusted between a single-particle layer (thickness: 0.15 μm) and a multi-particle layer (thickness: 5 μm). SEM photographs of the single-particle layer are shown in FIGS. 5(a) and 5(b). From FIG. 5(a), it can be seen that silica particles are arranged substantially evenly on the inner wall of the micro reactor. FIG. 5(b) shows the shape of a surface of the particle layer formed on the micro reactor.

To the silica particles, which constituted the single-particle layer, platinum fine particles were adsorbed.

In the micro reactor having the silica particle layer with the platinum fine particles adsorbed thereto, ethylene was hydrogenated. The reaction rate was 1.5 times higher than that of the case in which a platinum fine particle layer, instead of the silica particle layer, was adsorbed to the inner wall of the micro reactor.

Example 2

In the present example, a CdSe particle layer was formed on the inner wall of the reactor in the micro reactor of EMBODIMENT 1.

First, a chloroform suspension including CdSe particles (average particle diameter: 2 nm) was prepared. The suspension was poured into the capillary-type micro reactor, and dried at a room temperature, so as to form a CdSe particle layer on the inner wall of the micro reactor. The thickness of the CdSe particle layer could be changed between 10 nm and 50 nm.

Example 3

In the present example, a patterned silica particle layer was formed on the inner wall of the reactor in the micro reactor of EMBODIMENT 1.

First, hydrophobicity was given to the inner wall of the capillary-type micro reactor by surface processing with trimethoxydodecylsilane. Then, the inner wall was covered with a patterning mask, and ultraviolet rays were radiated, so as to give hydrophilicity to the irradiated portion. Next, a suspension including silica particles, which had been prepared in advance as in EXAMPLE 1, was poured into the micro reactor, and dried at 80° C. As a result, a patterned silica particle layer was formed on the hydrophilic portion of the inner wall of the micro reactor.

Example 4

In the present example, patterned gold electrodes were formed on the inner wall of the reactor in the micro reactor of EMBODIMENT 2.

First, hydrophobicity was given to the inner wall of the capillary-type micro reactor by surface processing with trimethoxydodecylsilane. Then, the inner wall was covered with a patterning mask, and ultraviolet rays were radiated, so as to give hydrophilicity to the irradiated portion. Next, a suspension including gold nanoparticles (particle diameter: 12 nm), which had been prepared in advance, was poured into the micro reactor, and dried at 80° C. As a result, a patterned gold particle layer, in which the gold nanoparticles were aligned, was formed only on the hydrophilic portion.

By sintering the gold particle layer of the micro reactor at 400° C., a gold film was obtained. The conductivity of the gold film, measured by a direct current four-electrode method, was $3 \times 10^7$ (S/m), which is a value sufficiently practical for electrodes.

Example 5

In the present example, a silica gel layer was formed on the inner wall of the reactor in the micro reactor of EMBODIMENT 3, and trypsin was supported by the silica gel layer.

First, 1% by weight of latex beads water suspension was poured into the capillary-type micro reactor and dried, so as to form a latex particle layer on the inner wall of the micro reactor, as in EXAMPLE 1. Then, a sol solution, in which trimethoxysilane, ethanol, water, and hydrochloric acid were mixed (trimethoxysilane:ethanol:water:hydrochloric acid=1:1:0.5:0.0005), was caused to pass through the micro reactor, so that spaces between the latex particles in the latex particle layer were filled with sol by capillary force. By drying the sol and thereby obtaining silica gel, a silica gel layer was formed. Then, the latex particles were thermally decomposed by heating at 600° C. in an airflow of oxygen. Those parts where the latex particles had existed were turned into pores. Thus, a silica gel layer having a so-called reverse opal structure was obtained. Subsequently, trypsin was supported by the silica gel layer having the reverse opal structure.

The trypsin was supported by the following method.

First, by hydrolyzing aminopropylsilane on the surface of the silica gel layer, amino groups were supported by the surface of the silica gel layer. Then, by reacting succinic anhydride with the amino groups, carboxyl groups were introduced onto the surface of the silica gel layer. Further, by reacting the carboxyl groups with trypsin, the trypsin was supported by the surface of the silica gel layer through covalent bonding.

In the micro reactor having the silica gel layer supporting trypsin, benzoylarginineparanitroanilide (BAPA) was decomposed. The reaction rate was six times higher than that of the case in which trypsin alone was provided to the micro reactor without forming the silica gel layer. That is, by supporting trypsin by the silica gel layer having the reverse opal structure, the reaction rate became six times higher.

Example 6

In the present example, a titania gel layer was formed on the inner wall of the reactor in the micro reactor of EMBODIMENT 3.

First, 50% by weight of latex beads water suspension was poured into the capillary-type micro reactor and dried, so as to form a latex particle layer on the inner wall of the micro reactor. The thickness of the latex particle layer was about 1 μm, so as to cover the inner wall of the micro reactor completely. Then, by impregnating the latex particle layer with titania sol in which titanium isopropoxide, ethanol, water, and hydrochloric acid were mixed, spaces between the latex particles in the latex particle layer were filled with the titania sol. Next, the titania sol was dried to obtain tinania gel. After that, the latex particles were thermally decomposed by heating at 600° C. In this way, those parts where the latex particles had existed were turned into pores. Thus, a titania gel layer having a so-called reverse opal structure was obtained.

While radiating ultraviolet rays (wavelength: 360 nm), metane gas and oxygen were caused to simultaneously pass through the micro reactor having the titania gel layer. As a result, methanol was obtained at 5% yield.

Example 7

In the present example, a silica gel layer supporting titania was formed on the inner wall of the reactor in the micro reactor of EMBODIMENT 3.

First, a 50%-by-weight suspension of latex beads to which anatase-type titania was adsorbed by a heterocoagulation method was prepared. The suspension was poured into the capillary-type micro reactor and dried, so as to form a latex particle layer supporting titania, on the inner wall of the micro reactor. Then, a sol solution, in which tetramethoxysilane: ethanol, water, and hydrochloric acid were mixed (tetramethoxysilane:ethanol:water:hydrochloric acid=1:1:0.5:0.0005), was caused to pass through the micro reactor, so that spaces between the latex particles in the latex particle layer were filled with sol by capillary force. By drying the sol and thereby obtaining silica gel, a silica gel layer was formed. Then, the latex particles were thermally decomposed by heating at 600° C. in an airflow of oxygen. Those parts where the latex particles had existed were turned into pores. Thus, a silica gel layer having a so-called reverse opal structure was obtained. At this time, titania remained and was supported by the silica gel layer.

While radiating ultraviolet rays (wavelength: 360 nm), metane gas and oxygen were caused to simultaneously pass through the micro reactor having the silica gel layer supporting titania. As a result, methanol was obtained at 4% yield.

Example 8

In the present example, titatia nanoparticles were formed as composite particles (cover particles) on the inner wall of the reactor in the micro reactor of EMBODIMENT 1.

Figure 6:
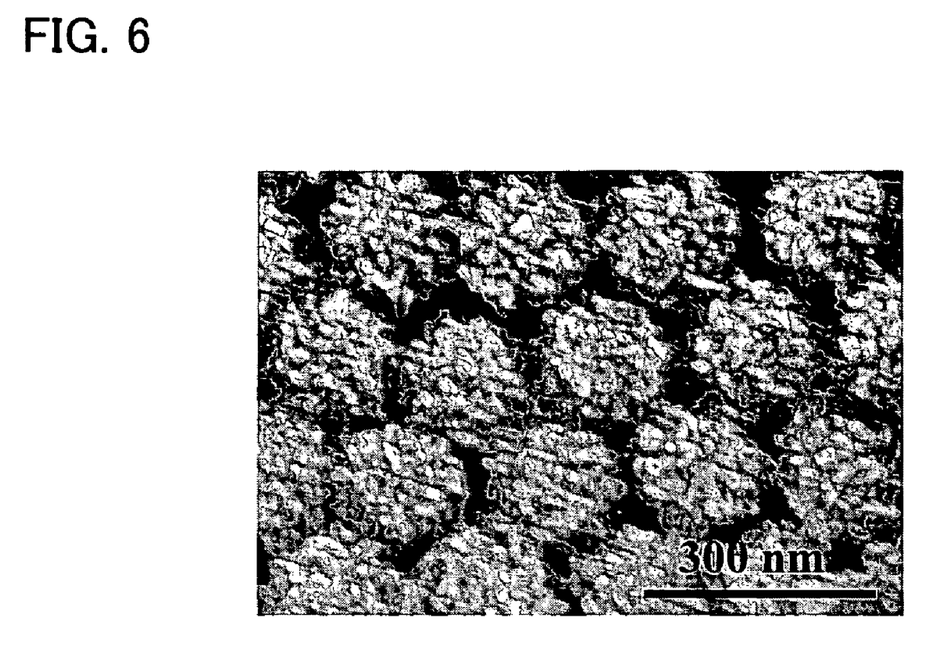
FIG. 6 is an image of composite particles of EXAMPLE 8.

First, negative surface charges of silica colloid (diameter: 120 nm) was turned into positive charges by surface modification with polyethyleneimide. Then, anatase-type titania nanoparticles (particle diameter: 20 nm), which also had negative charges, were supported by the silica colloid, so as to form composite particles. FIG. 6 is an SEM image of the composite particles. Subsequently, the composite particles were suspended in a mixed solvent of ethanol and water (ethanol: water=6:4). The mixed solvent was poured into capillaries (200 μm and 530 μm) and dried. As a result, a micro reactor having titania nanoparticles supported by the inner wall of the capillaries was obtained. By using the micro reactor, methylene blue was photolyzed. The decomposition rate was much higher in each capillary than that of the case in which the micro reactor was not used. In particular, if the 200 μm capillary was used, methylene blue was photolyzed at a rate 150 times higher than that of the case in which the micro reactor was not used.

The specific embodiments and examples in BEST MODE FOR CARRYING OUT THE INVENTION section are described only for clarifying technical contents of the present invention. The present invention should not be interpreted as being limited to these specific examples. The present invention may be carried out in various ways within the scope of the spirit of the present invention and the following claims.

INDUSTRIAL APPLICABILITY

The micro reactor device of the present invention can realize a catalyst reactor device having a particle layer on the inner wall of the micro reactor device, the particle layer having spaces on the order of several nanometer to several micrometer. This can improve efficiency of catalyst reactions. In addition, since surface modification and patterning can be performed on the inner wall of the micro reactor device, precise reaction control is possible. There is also an effect that electrodes can be provided easily to the micro reactor device.

The invention claimed is:

1. A method of manufacturing a micro reactor device that includes a tubular reactor as a flow path and allows reaction species to react in the reactor, the method comprising the step of:

forming a particle layer including particles on an inner wall of the reactor by causing a dispersion liquid of particles to flow through the reactor and drying the reactor.

2. the method as set forth in claim 1, wherein
in the particle layer, the particles are aligned regularly.

3. the method as set forth in claim 1, wherein
a solvent of the dispersion liquid is a mixed solvent including at least two kinds of solvents.

4. the method as set forth in claim 1, wherein the flow path has a cross section of a round or elliptical shape.

5. The method as set forth in claim 1, wherein
the particles are a catalyst.

6. The method as set forth in claim 1, wherein
a catalyst is supported by the particle layer.

7. The method as set forth in claim 1, wherein
the particle layer includes composite particles formed by supporting a functional material by the particles.

8. The method as set forth in claim 7, wherein
in the composite particles, the functional material covers the particles.

9. The method as set forth in claim 7, wherein
the composite particles are formed by a heterocoagulation method.

10. The method as set forth in claim 7, wherein
the composite particles are formed by controlling a surface charge of the particles by a surface-active agent.

11. The method as set forth in claim 1, wherein
a hydrophilicity process and a hydrophobicity process are performed on desired regions of the inner wall of the reactor, and a water dispersion liquid of particles is caused to flow through the reactor.

12. The method as set forth in claim 11, wherein
the particles are a conductive material, and electrodes are formed by sintering the particles.

13. The method as set forth in claim 1, wherein
using the particle layer as a mold, a layer is formed by filling spaces between the particles of the particle layer with sol or nanoparticles and solidifying the sol or nanoparticles, and the particles of the particle layer are removed.

14. The method as set forth in claim 13, wherein the particles are removed by thermal decomposition.

15. The method as set forth in claim 13, wherein
a catalyst is supported by the layer formed by filling and solidifying the sol or nanoparticles.

16. A micro reactor device, comprising a tubular reactor as a flow path, for allowing reaction species to react in the reactor, the micro reactor device further comprising:
a particle layer including particles, provided on an inner wall of the reactor, the particles being composite particles supporting a functional material.

17. The micro reactor device as set forth in claim 16, wherein
in the particle layer, the particles are aligned regularly.

18. The micro reactor device as set forth in claim 16, wherein the flow path has a diameter between 1 µm and 1 mm.

19. The micro reactor device as set forth in claim 16, wherein the particles of the particle layer have a diameter between 1 nm and 10 µm.

20. The micro reactor device as set forth in claim 16, wherein the particle layer has a thickness of not more than 20 µm.

21. The micro reactor device as set forth in claim 16, wherein the particles are a catalyst.

22. The micro reactor device as set forth in claim 16, wherein the composite particles are covered particles that are the particles covered with the functional material.

23. The micro reactor device as set forth in claim 16, wherein the particle layer is patterned.

* * * * *